United States Patent [19]

Caille

[11] Patent Number: 4,825,053
[45] Date of Patent: Apr. 25, 1989

[54] SYSTEM FOR WEIGHING AN ARTICLE AND FOR EDITING A LABEL SERVING AS A TRANSPORT COUPON

[75] Inventor: Roger Caille, Ecully, France

[73] Assignee: Jet Services, France

[21] Appl. No.: 151,320

[22] Filed: Feb. 1, 1988

[30] Foreign Application Priority Data

Jan. 30, 1987 [FR] France ............................ 87 01303

[51] Int. Cl.⁴ .............................................. G06K 5/00
[52] U.S. Cl. ..................................... 235/380; 235/375
[58] Field of Search ................................. 235/375, 380

[56] References Cited

U.S. PATENT DOCUMENTS 3,891,492 6/1975 Watson ................................ 235/384

Primary Examiner—Harold I. Pitts
Attorney, Agent, or Firm—Wall and Roehrig

[57] ABSTRACT

The invention relates to an automatic system for weighing an article, with editing of a transport coupon.

According to the invention, the system comprises, around a microprocessor (5), a scale (3), a payment card reader (11), a keyboard (4) for the customer, a display unit (10) for the customer, a terminal (14) for an operator, associated with a locking means (15, 15a).

The invention is applicable to parcels carrying service distribution points.

10 Claims, 16 Drawing Sheets

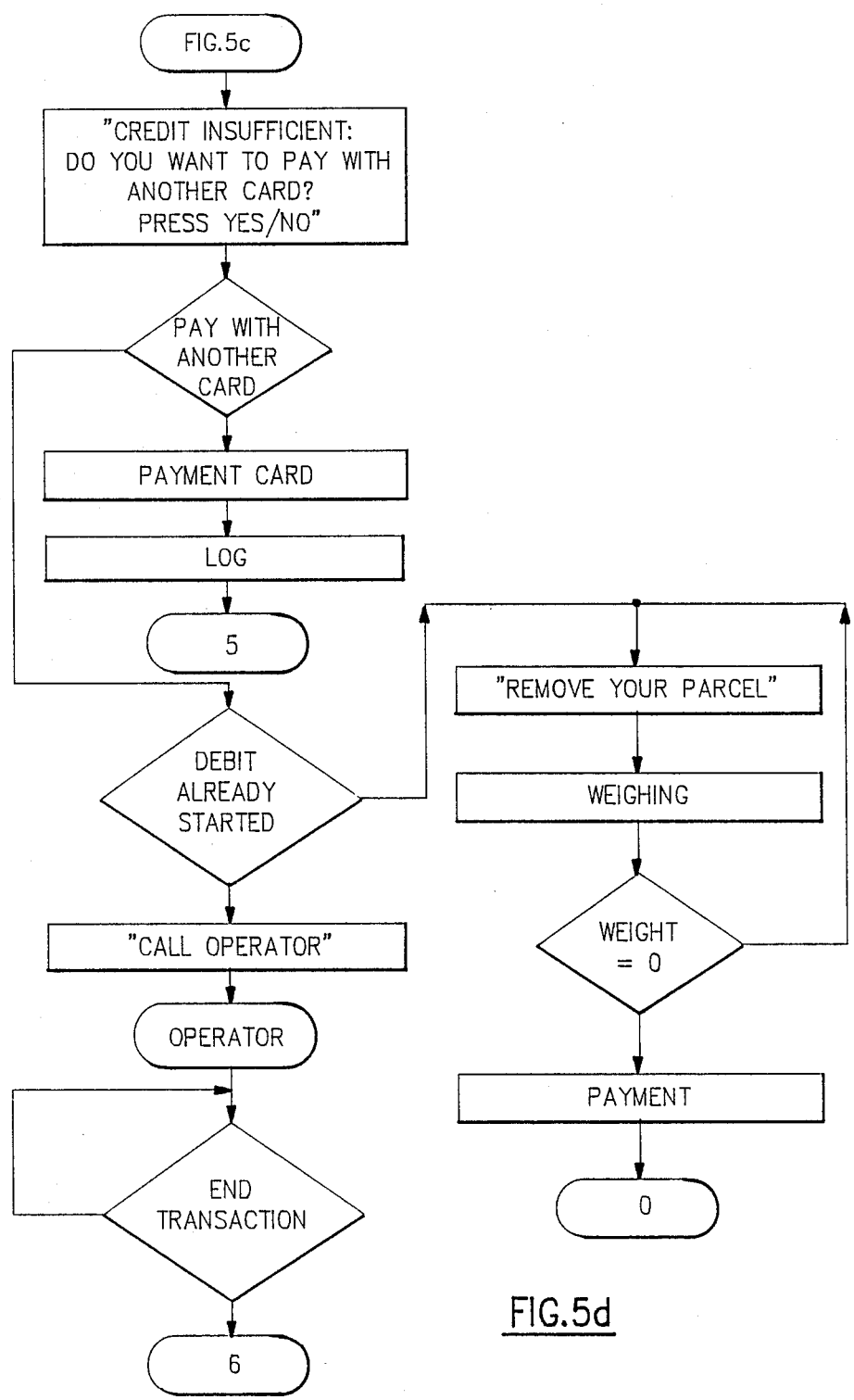

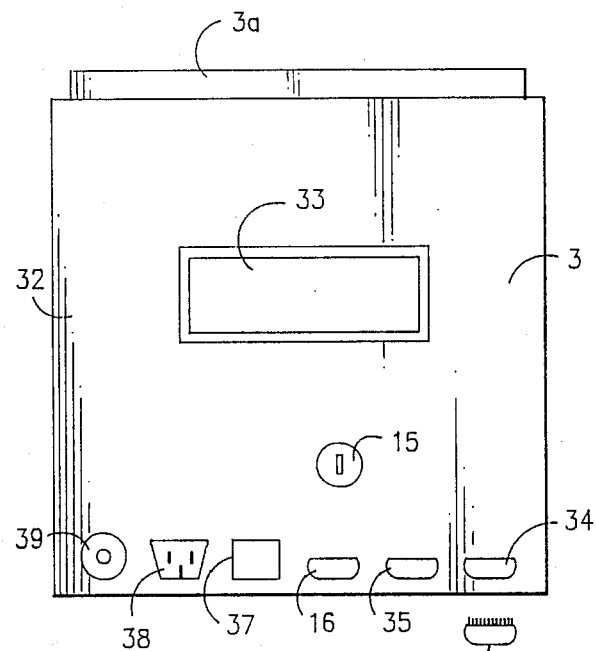
FIG.11b
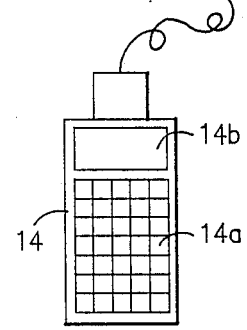
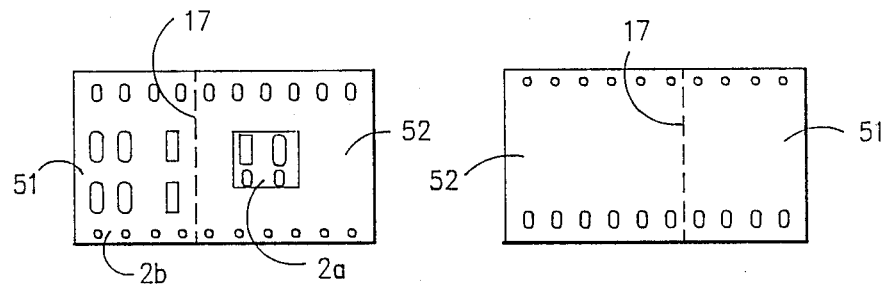
FIG.12　　　　　　FIG.13

SYSTEM FOR WEIGHING AN ARTICLE AND FOR EDITING A LABEL SERVING AS A TRANSPORT COUPON

The present invention comes within the field of the transportation of articles, whatever may be their size, their nature or their weight, and more particularly within the field of parcel carrying.

In this latter field, distribution points for parcel carrying services are already known in which the user has the article to be transported weighed by an operator, and pays the price charged as a function of the weight and of the destination, the operator issuing a receipt for the article and affixing thereto a label serving as a transport coupon.

The computerized automation of such a service entails the provision and combination of the following elements:

by way of peripherals:
- a scale supplying a numeric item of information whose value is the weight of the article
- a user keyboard for the acquisition by the user firstly of a coded item of information representing the destination of the article and secondly of various commands;
- a display unit for messages or data intended for the user;
- a payment card reader, said cards comprising a medium for an item of information which can be machine-read and machine-modified, having the value of a credit;
- a printer for editing and outputting the label serving as a transport coupon;

as a central processing unit:
- a data processing unit, for example a microprocessor;
- a read-only memory for the storage of data processing software, permitting a dialog with the user, and ensuring the automatic functioning of the system, as a function of the data exchanged both with the user and with the various peripherals.

In addition, the abovementioned data processing software must ensure the elementary functioning of the weighing system, according to at least the following stages:

(a) the weight of the article is determined and monitored with the scale (b) the user inputs the destination of the article with the keyboard (c) the system determines the cost of transport, from parameters stored in the read-only memory, such as charges or geographical identification of the location of the weighing system (d) the user introduces into the reader his payment card, which is monitored; then, on the data medium of said card, the initial credit is replaced by a new value equal to said initial credit less the cost of transport (e) with the printer a transport coupon, indicating the destination in particular, is edited to be affixed by the user to the article.

Automation as generally defined above cannot deal with the wide variety of situations encountered at a distribution point for parcel carrying services.

And the invention relates to an automatic weighing system as defined above, possessing great flexibility or versatility in respect of various situations encountered in use, and able to terminate any transaction initiated by a user or customer.

According to the present invention, the automatic weighing system possesses a terminal intended for an operator, possessing a display unit for messages or data intended for the operator, and an operator keyboard for the acquisition by the operator of various commands or data, particularly in place of those of the user, capable of ensuring complete functioning of the system whatever may be, in particular, the errors made by the user.

The intervention of the operator, by virtue of his own terminal, also makes it possible to provide various functions other than automatic weighing which are necessary to the management of the parcel carrying services distribution point.

A system according to the invention can be designed either as a device of the "self-service" type, that is to say controlled exclusively by dialog between the user and the machine, or as an assisted device, that is to say under the control of an operator who can intervene in some or all of the abovementioned dialog in order to conduct or complete a transaction.

The present invention is now described with reference to the attached drawings, in which:

FIGS. 3, 4, 5, 5a, 5b, 5c, 5d, 5e and 6 represent in a detailed manner the various parts or stages of the flowchart shown in FIG. 2;

FIGS. 11a and 11b represent respectively the front face and the rear face of an automatic weighing machine, with transport coupon editing, incorporating a system according to FIG. 1

FIG. 12 shows an editing medium which can be used with the printer forming part of the system according to FIG. 1, which medium is seen from the side intended for the editing FIG. 13 shows the same medium from the opposite side to that shown in FIG. 12.

Figure 1:
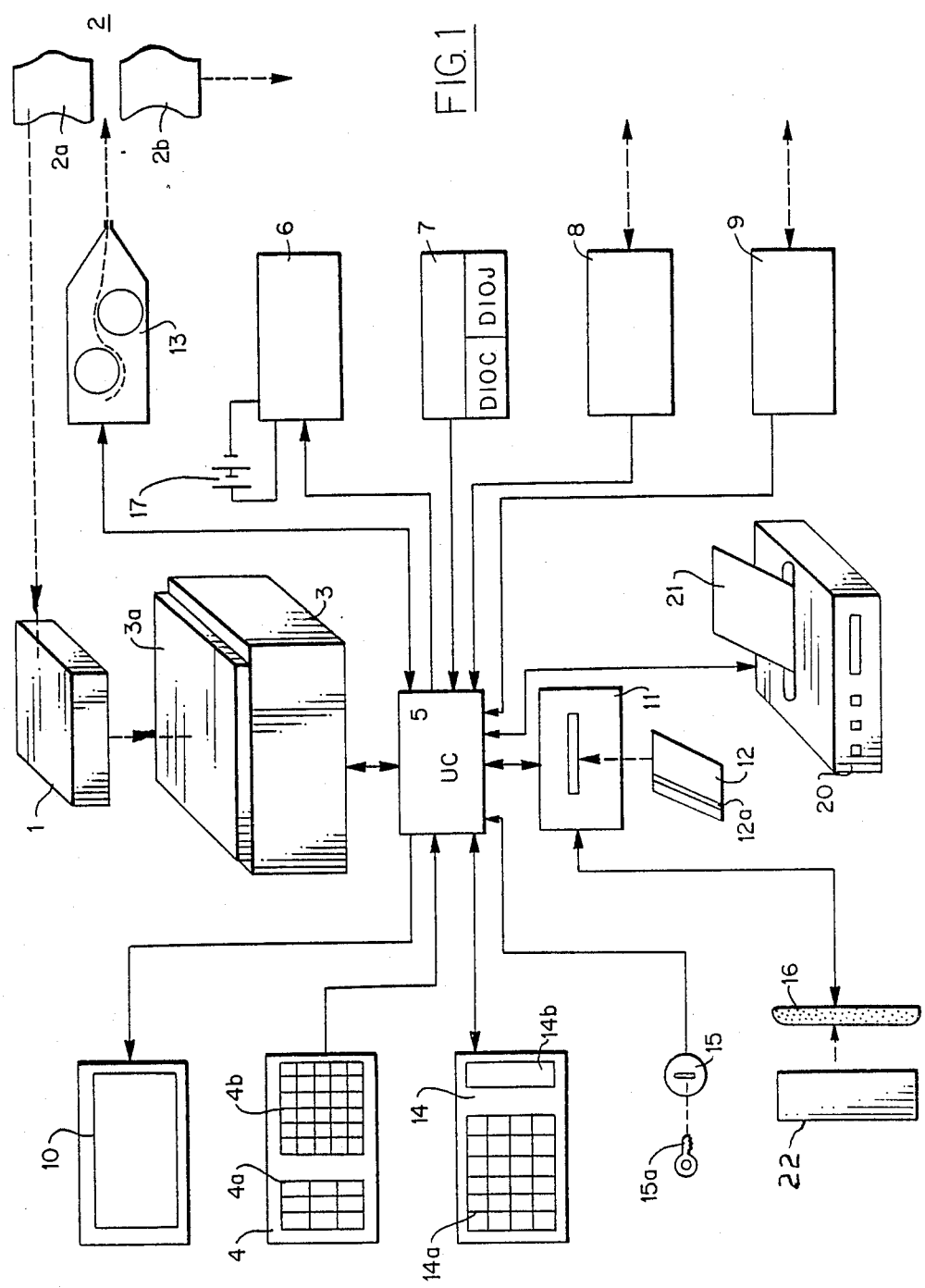
FIG. 1 shows diagrammatically the entirety of an automatic weighing system in accordance with the present invention FIG. 2, divided into two sub-figures (2a) and (2b), represents the general functional flowchart describing the sequencing of the various operations corresponding to a single transaction of the system shown in FIG. 1

According to FIG. 1, the production of a system according to the invention requires the following elements:

on the user or customer side, the parcel or article (1) to be dispatched, and the payment card (12) possessing a magnetic strip (12a) intended for the writing or reading of data by the system on the operator side, a locking key (15a) making it possible to interrupt the automatic functioning of the system in favor of partially assisted functioning, that is to say with the assistance of said operator.

The output obtained from the system according to FIG. 1 is a document (2) comprising two parts, namely (2a), forming a transport coupon to be stuck on the article (1), and a part (2b) forming an invoice or voucher for the transaction which has taken place.

As for the system per se, it possesses the following essential elements or peripherals:

a scale (3), fitted with a tray (3a) intended for the placing or reception of the article (1), supplying a numeric item of information whose value is the weight of the article (1)

a keyboard (4) intended for the user, for the acquisition by the latter firstly of a coded item of information, representing the destination of the article, and secondly of various commands; for this purpose, the keyboard comprises two parts, namely a part (4a) allocated to numeric keys and a part (4b) allocated to command or function keys a message or data display unit (10) intended for the user; this may be, for example, a liquid crystal display comprising a plurality of lines of characters a reader (11) of payment cards (12), making it possible to read and modify all or some of the data present on the magnetic medium (12a), particularly those having the value of a credit; this reader is likewise equipped with mechanical means making it possible to introduce and return the payment card; this is a conventional component which it is not necessary to describe in detail; according to the invention, the payment card is never retained by the reader, even in case of a handling error or attempted fraud, as will be seen below a printer (13), for editing and outputting the document (2) defined above, namely the transport coupon (2a) and the receipt or invoice (2b)

a terminal (14) intended for the operator, possessing a message or data display unit (14b) intended for said operator, and a keyboard (14a) for the acquisition by said operator of various commands or data, particularly instead of those of the user, which commands can ensure complete functioning of the system according to FIG. 1, whatever may be, in particular, the mistakes or handling errors made by the user or customer a locking member (15) intended for the operator, possessing two positions controlled by the key (15a), one in which the system functions totally automatically, without intervention by the operator, and the other with partially assisted functioning, to compensate the inadequacies, errors or failings of the system and/or of the user an external printer (20), connected to and communicating with the system by any appropriate means, making it possible to edit a log (21) of the various transactions of the system a port (16) permitting, by means of a corresponding plug (22), appropriate communication with any central processing unit or other peripheral, for example connected in series or in parallel; this may in particular relate to a communication or link with a central computer.

All the members or components described above constitute the various peripherals of the system.

As for the central processing unit, it comprises:

a data processing unit (5), namely a microprocessor, connected to the various peripherals defined above a random access memory (6), whose supply voltage can be temporarily safeguarded by a battery (17) in case of interruption of the current supplying the system a read-only memory (7), providing in particular storage for the software necessary to the functioning of the system, namely a software system hereinafter referred to as DIOC, permitting transactions between the system and the user, and a software system hereinafter referred to as DIOJ, permitting various operations between the system and the operator; the same read-only memory likewise makes it possible to store, in the form of a database hereinafter referred to as DBAS, various data or parameters necessary to the configuration of the system, the transaction or the maintenance of the same system; the same database can likewise be stored, partly or wholly, in the random access memory (6)

a read-only memory (8), which can be plugged into the system and is of EPROM technology, storing various charging parameters which can be revised from time to time by replacing one module (8) with another a read-only memory (9) of EEPROM technology, having various parameters specific to the system, such as the geographical identification of the location of the parcel carrying service distribution point; thus, when the system is moved from one place to another, the corresponding parameters can be modified by replacing one module (9) with another.

Figure 11A:
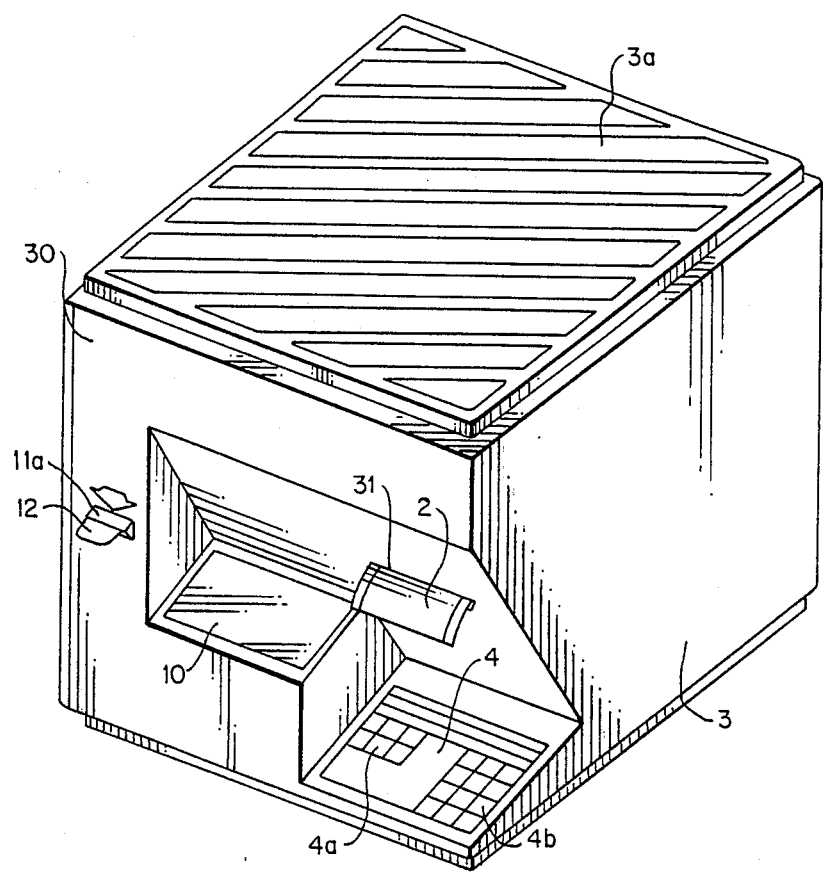

In accordance with FIGS. 11a and 11b, the machine combining all the elements or components described above possesses the outward appearance of a parallelepiped.

As can be seen in FIG. 11a, the weighing system according to the invention comprises a frame of generally parallelepipedal shape (3) surmounted by a tray (3a) of the scale (3), which is of suitable shape, in the present case substantially square. This tray in fact rests on the knife-edges (not shown) of the scale (3).

The anterior or front face (30) of the weighing system possesses a recess in which have been provided, respectively, the touch-sensitive keyboard (4), the liquid crystal display unit or display (10) and a slot (31) through which is issued the printed ticket (2) serving as a transport coupon (2a) and receipt (2b).

The touch-sensitive keyboard is in fact subdivided into two distinct parts, namely a numeric keyboard (4b) and a keyboard with function keys (4a).

Moreover, the anterior face (30) possesses a slot (11a) for inserting the payment card (12), forming part of the card reader (11) situated in the vicinity of one of its lateral edges.

When the user has placed his parcel (1) on the tray (3a), the message indicating the weight is displayed on the liquid crystal display (10).

In fact a succession of messages, which will be detailed below, is displayed, requiring replies from the user which are transmitted by way of the numeric keyboard (4b) or of the function keyboard (4a), the latter in particular being intended to validate the replies indicated by way of the numeric keyboard (4b).

As a result of these various operations, the payment is made with the credit card (12) specific to each user, by means of a code known only to the latter. When the payment is made, the ticket (2) serving as a transport coupon (2a) and receipt (2b) is printed by means of the printer (13), said ticket (2) emerging from the printer via the slot (31).

It should be noted, and this is an original feature of the system according to the invention, that it is the user who himself writes on his payment card a code selected by himself alone, and that this code subsequently remains known only to him. During each transaction, the customer will enter his code into the machine, which will compare the code entered with the code read on the card (12) to validate the payment. This is a means of providing the desired security without recourse to communication with a central computer in order to monitor the user's code.

The posterior or rear face (32) of the weighing system according to the invention, shown in FIG. 11b, possesses a liquid crystal display (33) intended to enable the operator to monitor the weighing.

The posterior face likewise possesses three sockets, (16), (34) and (35) respectively, for connection to the microprocessor (5) of the weighing system, any other peripheral or a central computer, the printer (20) and the terminal (14). The latter is intended to permit interaction by the operator during the functioning of the weighing system. In order for this interaction to be possible, the operator must first actuate a key (15, 15a) locking the access to the microprocessor (5).

Reference (37) indicates the power-on switch of the weighing system, said power being provided by conventional cable, one end of which is plugged into the socket (38).

Moreover, the device making it possible to advance the coupon (2) within the printer and out of the printer (13) when the latter is not in action is controlled by a push-button (39).

In accordance with FIGS. 12 and 13, the label (2a) serving as a transport coupon and the receipt (2b) are grouped to form a single printed document capable of being separated into two parts, (51) and (52), by virtue of the tear-line (17). The face shown in FIG. 12 is intended for printing. The part (52) comprises the peel-off label (2a), stuck on the paper medium, by means of a sheet of the same dimensions and of non-adhesive surface which is itself stuck to the paper medium.

In accordance with FIGS. 2 to 10, the functional flowchart and the algorithms which ensure the automatic functioning of the system described above are shown with the following text conventions:

a rectangle including a text within inverted commas corresponds to a message displayed on the display unit (10)

a rectangle whose two short sides are doubled, that is to say shown by two parallel lines, corresponds to an action by the user of the system or machine, which may be the inputting of a value or command on the keyboard (4), or a manual action such as introducing the payment card (12) into the card reader (11) or withdrawing it therefrom a rectangle whose two short sides are in thick lines corresponds either to actuation of a member of the system, commanded and controlled by the microprocessor (5), or to an independent action by the system such as an arithmetic function, commanded or executed by the microprocessor (5)

a rectangle each short side of which comprises a thick line and a parallel thin line corresponds to the interaction of a member of the system with the user, under the command and control of the microprocessor a rectangle having rounded short sides corresponds to an action by the operator of the system or machine, that is to say the person under whose control the machine is placed, and who ensures its proper functioning and maintenance; such an action corresponds to the inputting by the operator of commands or values on the terminal (14)

a lozenge represents a question or choice, and the black-shaded corner of the latter corresponds to the reply "yes".

As FIG. 1 shows, the various peripherals and the microprocessor (5) interchange various messages, or commands, which are as specified in the detailed description below of the system control software.

In this same description, the software or group of programs ensuring an elementary transaction in dialog with the user or customer is called hereinafter DIOC. And the software or group of programs ensuring various functions in dialog with the operator is called hereinafter DIOJ.

As will be seen, and is an essential feature of the present invention, the DIOC and DIOJ software pieces interact with one another, at predetermined points in their operation, particularly in order to permit a complete transaction with the customer. However, these two pieces of software are independent, and in particular DIOC can be run without recourse to DIOJ.

In FIGS. 3 to 6, the numerals 0 to 7 surrounded by an oval represent the levels in the flowchart shown in FIG. 1.

Figure 2A:
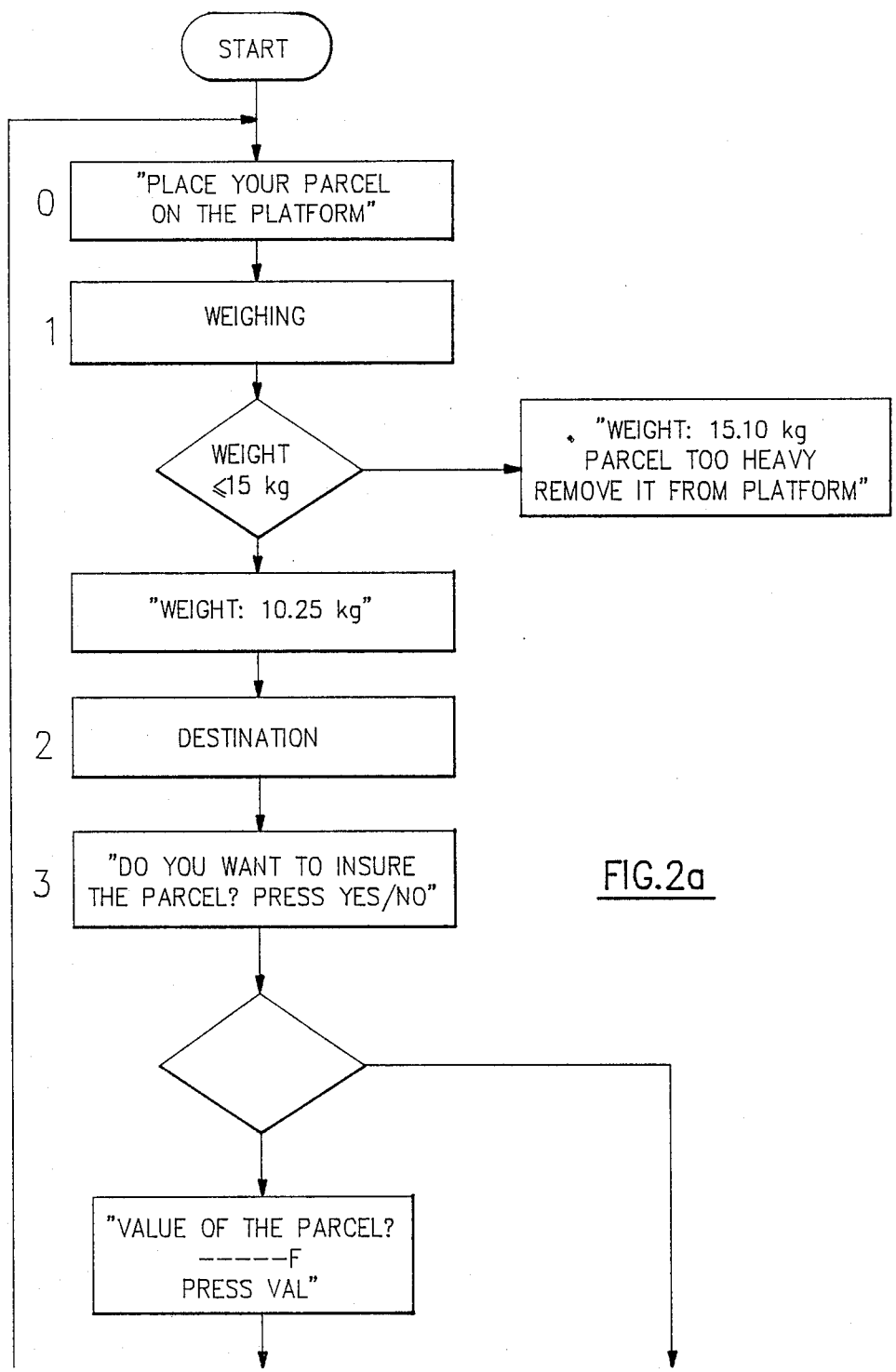
Figure 2B:
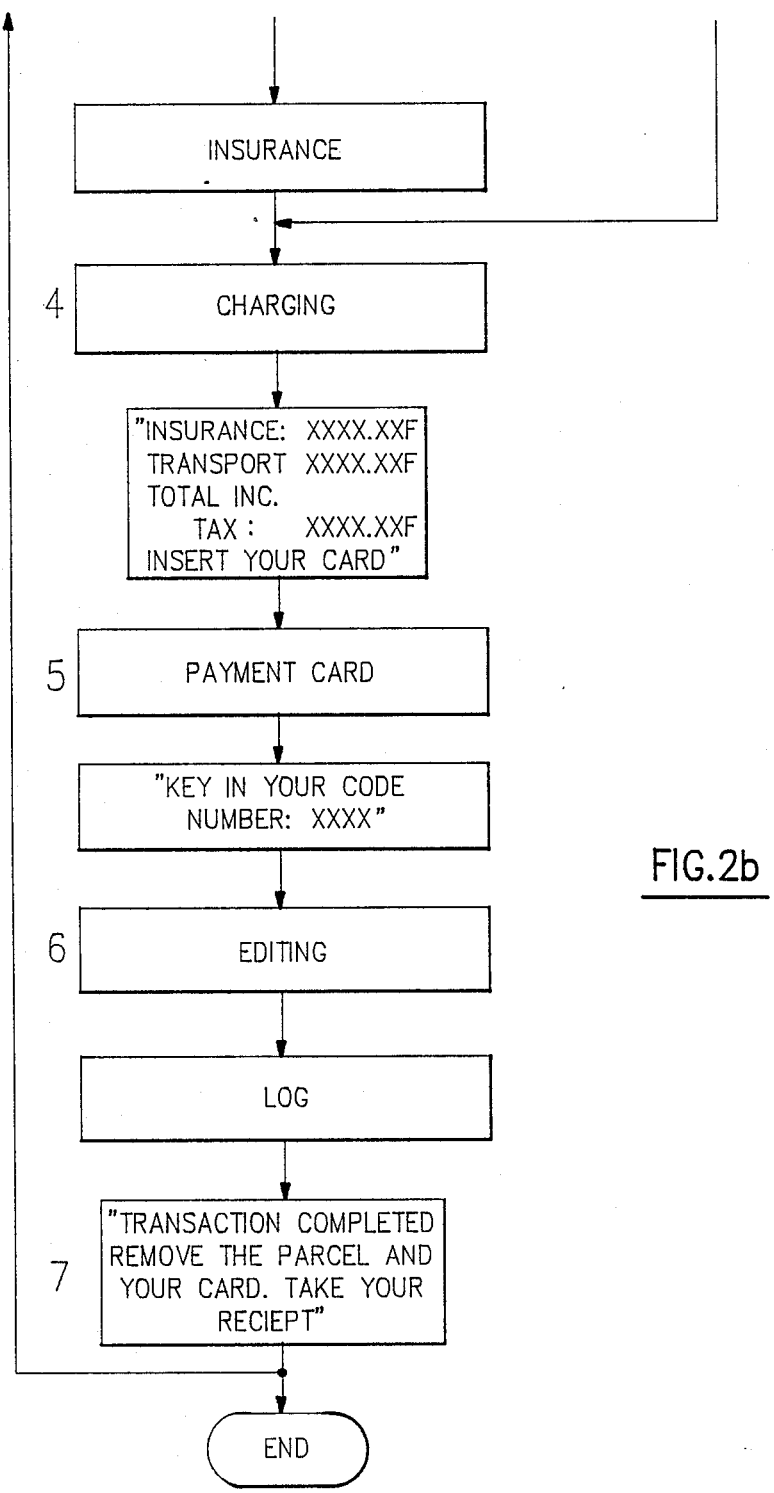

With reference to FIGS. 2a and 2b, a description is given below of the normal and most complete functional sequence of the system according to the invention:

0: initial message

The customer must place the parcel (1) on the tray (3a) of the scale (3), without introducing his card (12) into the reader (11)

1: weighing

The system indicates, via the display unit (1), the weight of the parcel. This must be less than 15 kg. If the weight is greater than 15 kg, the customer is informed that his parcel cannot be sent. If the weight is less than or equal to 15 kg, the system requests the code of the destination department, by displaying an appropriate message on the display unit (10)

2: destination

The customer must enter the postal code of the addressee, then validate it with the keyboard (4)

3: insurance

The system asks the customer, via the display unit (10), if he wishes to insure his parcel. The customer must reply by pressing the "yes" or "no" function key (4b) of the keyboard (4):

"no": the system moves directly to charging

"yes": the system asks the customer to specify the declared value of the parcel; the customer must input a number of not more than four digits and confirm it by pressing the "VAL" key 4: invoicing The system indicates via the display unit (10) the dispatch and insurance costs, together with the total cost, inclusive of all taxes, then requests insertion of the payment card (12)

5: insertion of the card (12)

The insertion of the card (12) into the reader (11) serves to validate the transaction 6: editing The system returns the card (12), prints the label (2a) and the receipt (2b), then ejects the card, the receipt and the label on the same paper medium (cf. FIGS. 12 and 13). The customer takes back his card. He peels the label (2a) from the paper medium ejected by the machine, and sticks it on the parcel. He retains the receipt (2b). The labeled parcel is sent for dispatch.

7: end of the transaction

The system reverts to phase 0 and repeats the initial message.

A description will now be given of the two pieces of software, DIOC and DIOJ, for conducting dialog with the customer and the operator respectively:

DIOC is a piece of software for conversing with the customer. The input and output interfaces for the customer are:
input: keyboard (4)
output: display unit (10)

DIOC communicates with the following peripherals:
the scale (3) for the weighing operation
the reader (11) for payment with the card (12)
the printer (13) for the editing of the document (2)
the printer (20) for the editing of the log (21) DIOC likewise communicates with the keyboard (4) and the display unit (10).

Figure 3:
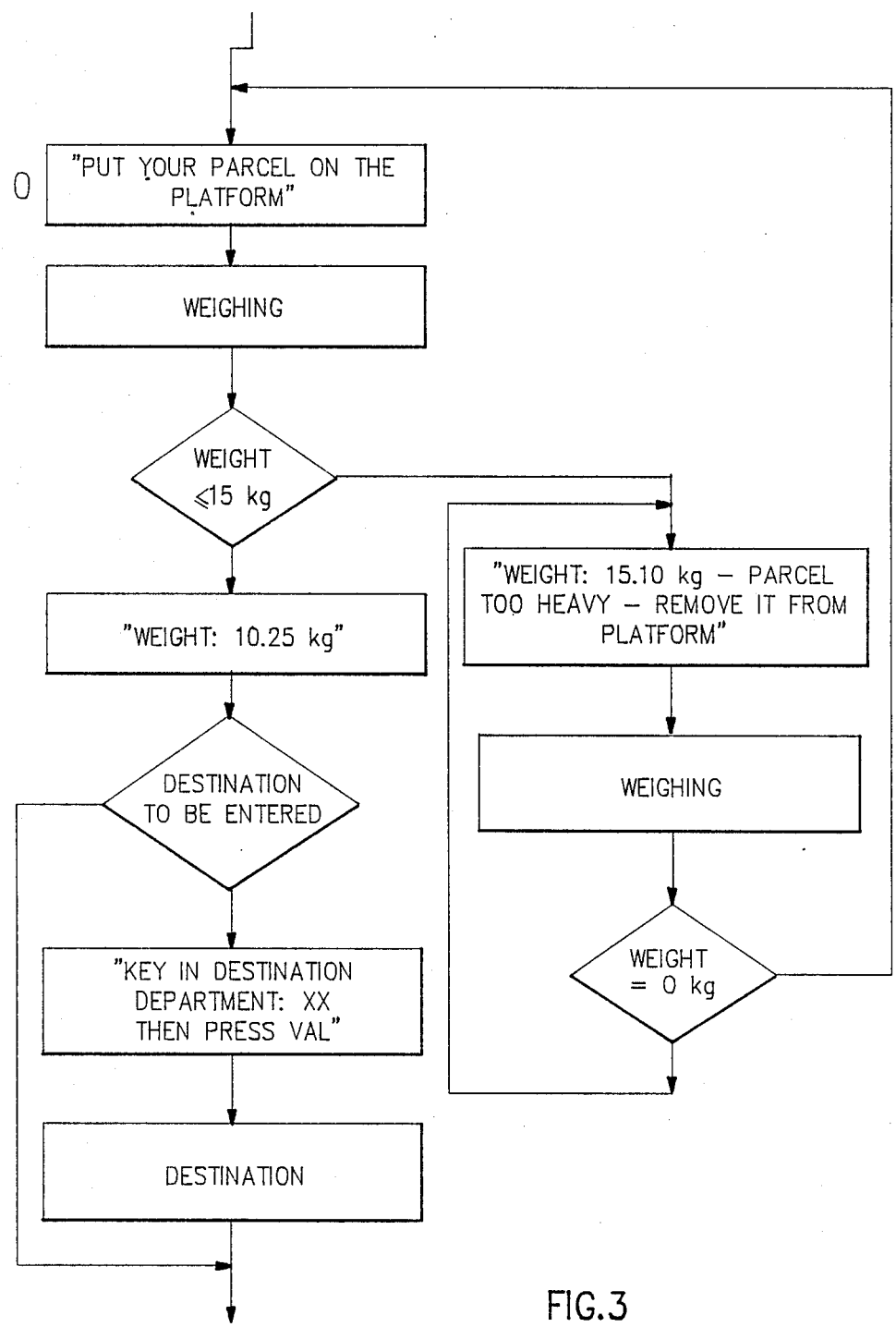

DIOC can be broken down into four parts (sub-programs):

1—DIOC weighing (user/weighing dialog): cf. FIG. 3

Figure 4:
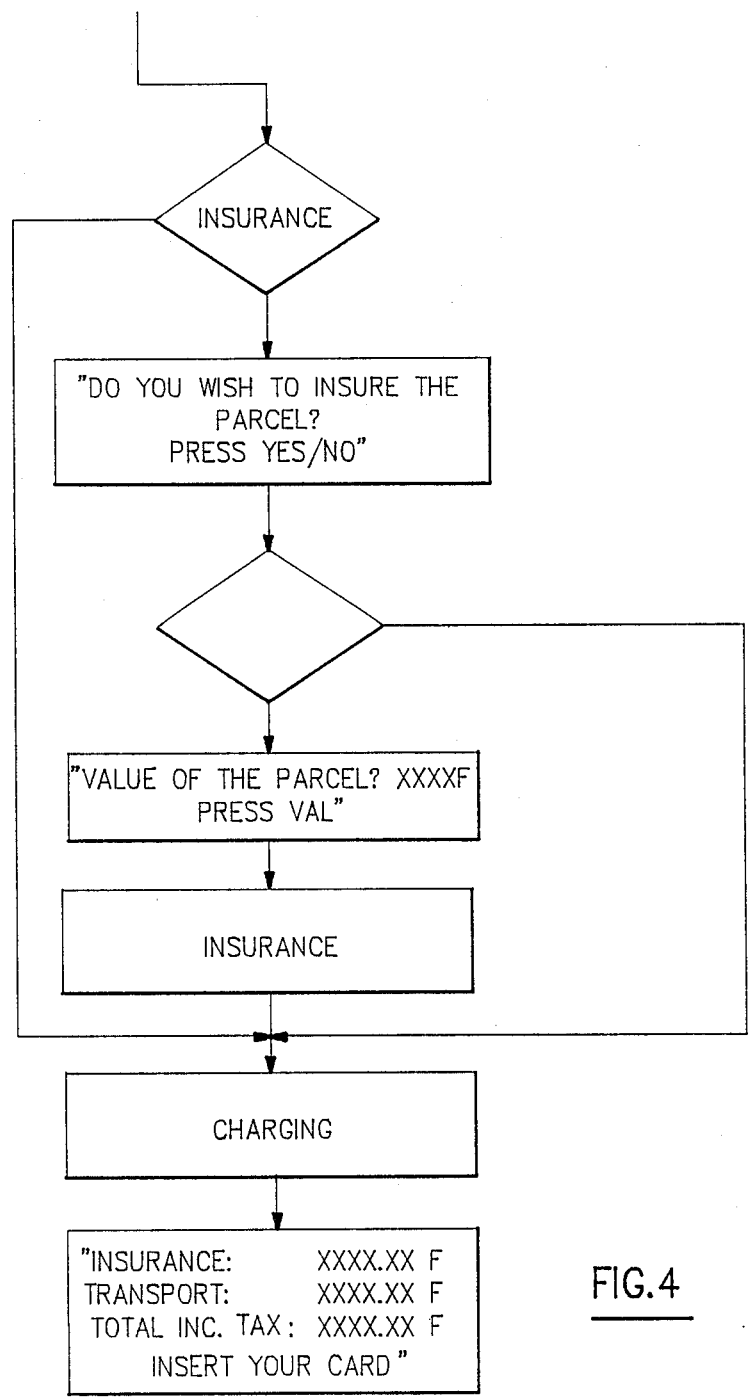

2—DIOC charging (user/charging dialog); cf. FIG. 4

3—DIOC payment (user/payment dialog); cf. FIGS. 5, 5a to 5e

Figure 6:
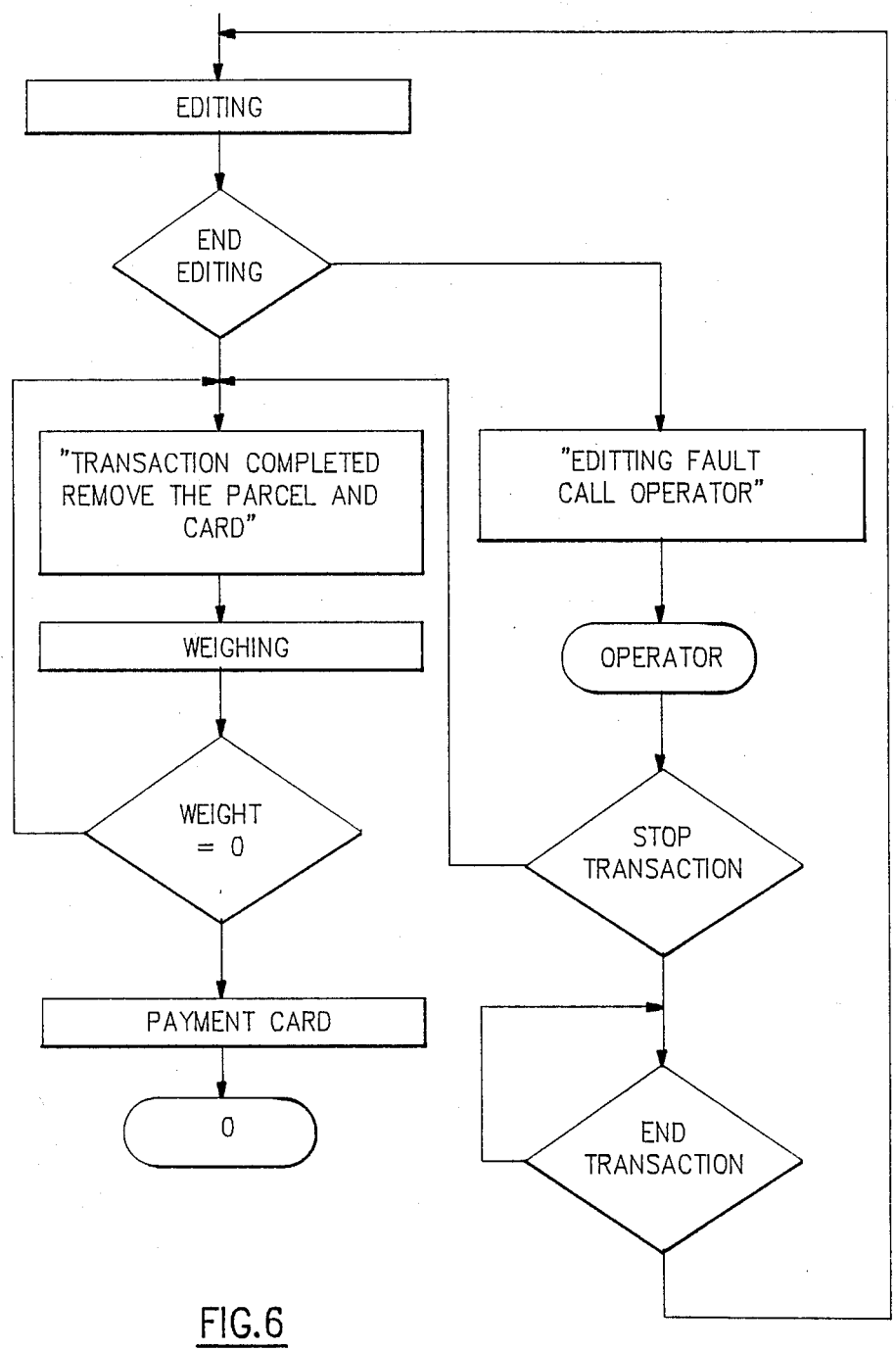

4—DIOC editing (user/output dialog); cf. FIG. 6.

The four parts are called in succession, as shown in FIG. 2.

I—DIOC/WEIGHING (cf. FIG. 3)

DIOC interrogates the scale (3) to learn whether a parcel (1) is present. To do this, DIOC actuates the scale (3). Then DIOC sends the command "lect-bal" (reading of the scal(e) to the scale (3). This triggers the reading of the scale. DIOC awaits a reply from the scale.

Two cases are possible:

(1.1) valid reading:

(3) has replied "weight read" to DIOC; the weight is sent to the DBAS database in the memory. DIOC can then read the weight and display it, by means of the display unit (10).

(1.2) invalid reading:

The parcel is too heavy. (3) sends the error message "erreur-bal" to DIOC.

In this case DIOC knows that the parcel is too heavy, tells the customer so, and requests him to remove the parcel. The appropriate message will remain until the weight is equal to 0 kg. When the weight is zero, DIOC sends the command "stop-bal" to (3), to stop the reading of the scale.

Each time DIOC wants to acquire a weight, DIOC must send the command "lect-bal" to the peripheral (3). When DIOC requires no further measuring (value of a weight), DIOC sends the command "stop-bal" to (3).

DIOC must then request the destination, only if the rate is not dependent on the charging. DIOC will know this by consulting the variable VAL-DESTINATION in DBAS; if VAL-DESTINATION is true, then DIOC must request the destination.

Once the DIOC/weighing function is completed, the DIOC-charging function follows.

Throughout the DIOC/weighing operation, as soon as DIOC receives a weight equal to 0 kg from the peripheral (3), the transaction is considered canceled. The system then reverts to the start "Initial message" (phase 0 of FIG. 2a).

II—DIOC/CHARGING (cf. FIG. 4)

This part of the dialog with the customer is very brief. While DIOC/charging takes place, DIOC continues to interrogate the scale by sending the command "lect-bal" to the peripheral (3). In fact, if (3) returns to a zero weight or an "erreur-bal" message, the transaction is canceled and the system returns to the start of DIOC (initial messag(e).

If the variable VAL-ASSURANCE which is in the DBAS database is true, DIOC/charging then asks the customer if he wishes to insure his parcel. If the customer insures his parcel, DIOC must set the variable CUSTOMER-ASSURANCE to true, in the database DBAS. At the end of DIOC/charging, DIOC must cease interrogating the scale (3), by sending the command "stop-bal" to (3), which deactivates the latter.

III—DIOC/PAYMENT (cf. FIGS. 5, 5a to 5e)

DIOC/payment asks the customer to insert his card and sends the order "lect-cart" (reading of the car(d) to the peripheral (11). As soon as DIOC/payment has sent the command "lect-cart", a 2-minute delay is triggered.

Two cases are possible:

(3.1) the peripheral (11) has not sent the command "card read" to DIOC/payment before the end of the timing of the two minutes (cf. FIG. 5a):

(a) in this case, if a card is present (cf. FIG. 5b):

(a1) If a debit has already been made, a message tells the customer to call the operator. The latter uses DIOJ to interrupt the system and has two options:

stop transaction:

DIOC sends a "stop" command to DIOC/payment, and DIOC/payment displays a message requesting that the parcel be removed. DIOC knows when the parcel has been lifted by interrogating the scale (3). Then DIOC sends the command "take card" to the reader (11). The latter will reply "card returned" and at that point DIOC returns to the start of DIOC/weighing with the initial message, having updated the log.

end of transaction: DIOJ sends the command "end" to DIOC/payment to warn that the transaction is to be ended. In this case, DIOC/payment updates the log and proceeds to the subsequent DIOC/editing dialog.

(a2) If no debit has yet been made DIOC instructs the customer to remove his parcel (DIOC knows when the parcel is lifted by interrogating the scale (3)). Then DIOC sends the command "return card" to the peripheral (11) which will reply "card returned". In this case, DIOC returns to the start of DIOC/weighing with the initial message, having updated the log (b) if there is no card present (cf. FIG. 5a);

(b1) If a debit has already been made, the same procedure is followed as in (a1), except that DIOC does not give the command "return card" to (11). The system will proceed with DIOC/weighing as soon as the customer has removed his parcel.

(b2) No debit has yet been made; the customer is told to remove his parcel (it is known when the customer has lifted his parcel by interrogation of the scale (3)). Once the parcel has been removed, the system proceeds to DIOC/weighing (initial message).

Figure 5:
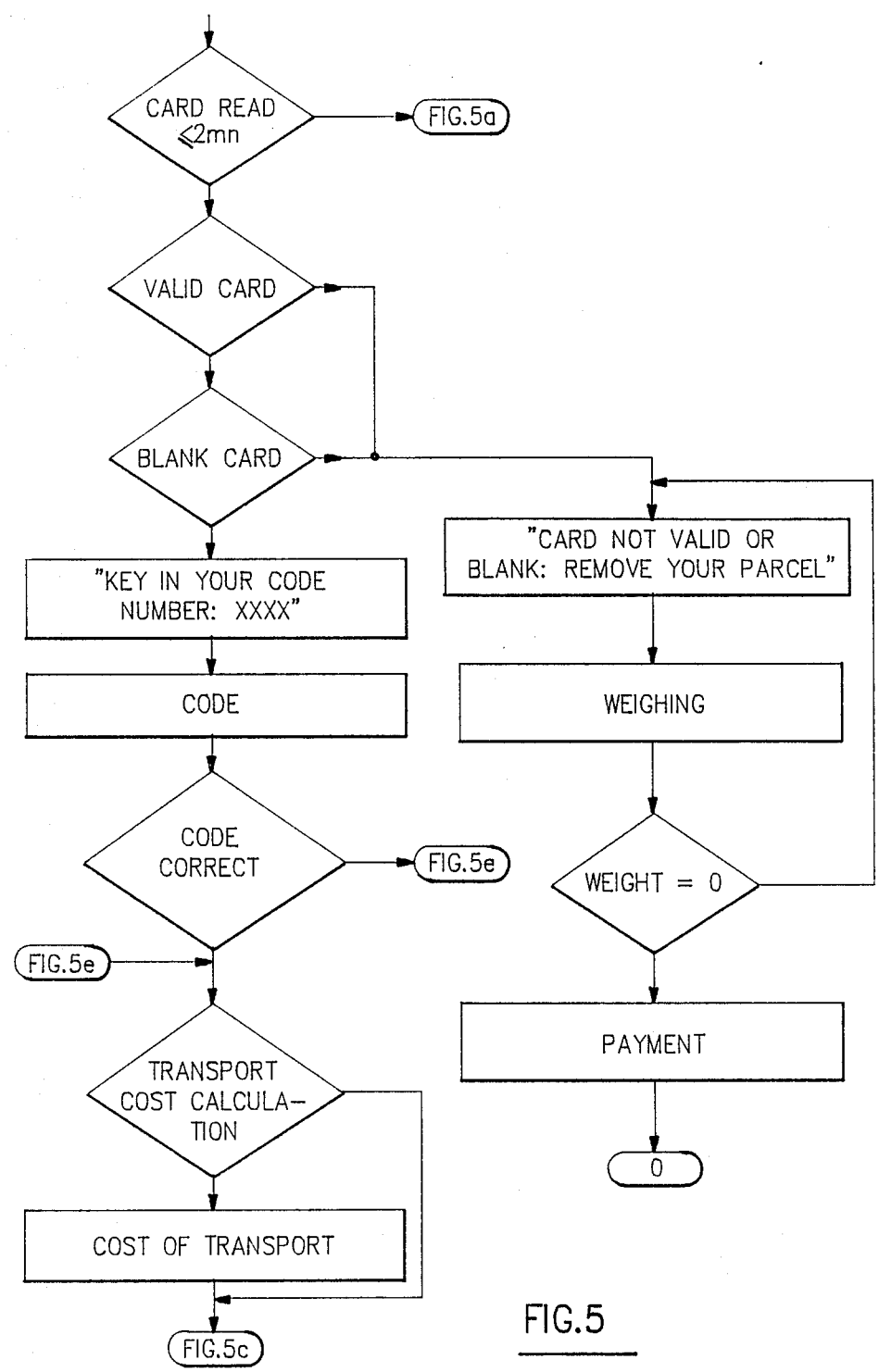
Figure 5A:
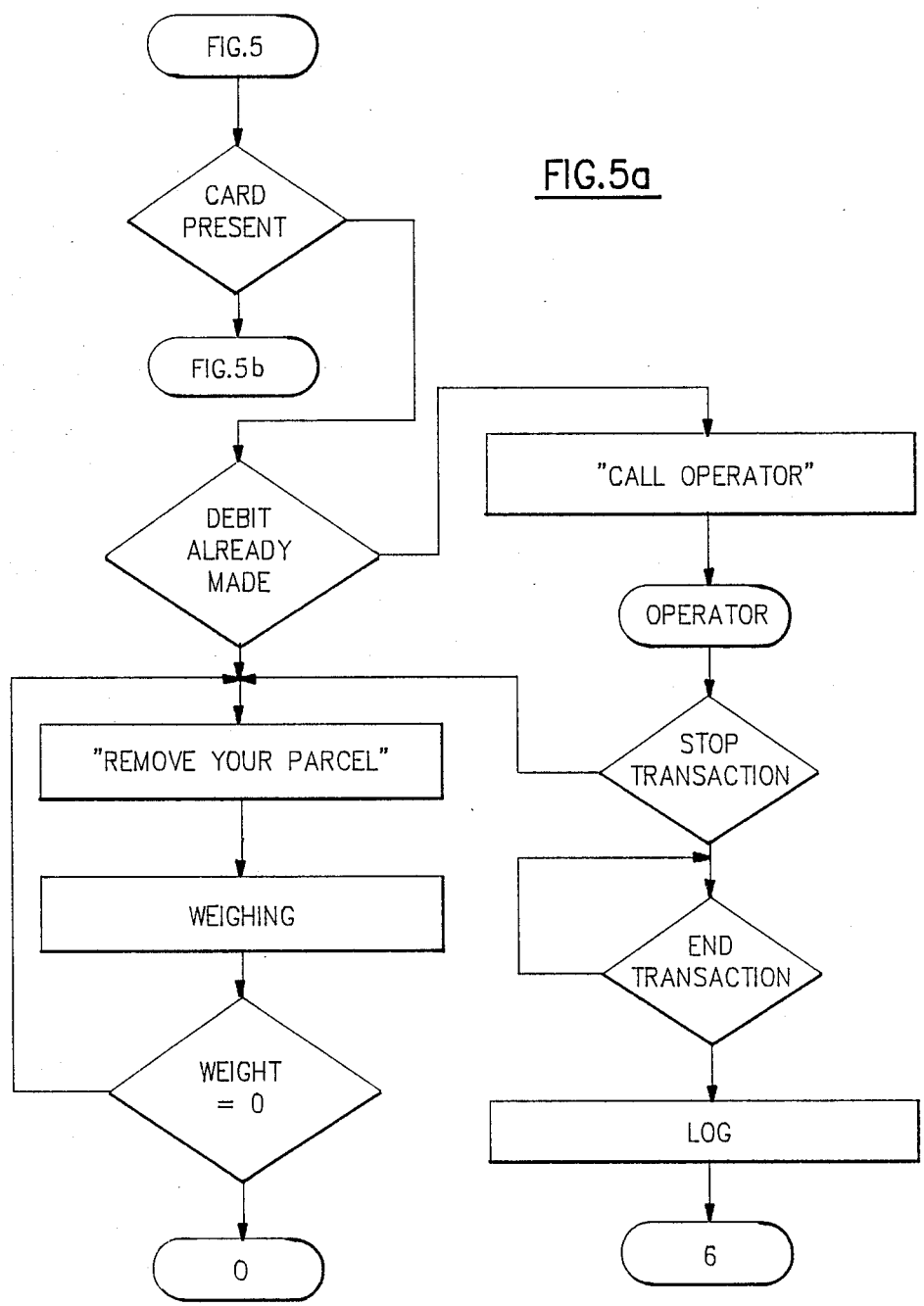

(3.2)—the peripheral (11) has replied "card read" to DIOC/payment, cf. FIG. 5

The peripheral (11) has updated the content of the card read in the DBAS database. DIOC tests whether the card is valid and not blank. If the test is false (card not valid, or blank), the customer is informed of the error and is told to remove his parcel. His card is then returned. DIOC/payment sends the command "return card" to (11), which will reply "card returned". Once the card has been returned, the system returns to the start of DIOC (DIOC/weighing and initial messag(e).

If the card is valid and not blank, DIOC/payment asks the customer to enter his secret code.

DIOC then tests the code entered:

3.2.1 code correct:

DIOC/payment examines DBAS to see whether it is necessary to calculate the transport cost. In the event that the calculation has to be carried out, DIOC/payment sends the command "cost". The microprocessor (5) performs the calculation, updates the variables resulting from the calculation in the database, and replies "end cost" to the peripheral (11).

Figure 5B:
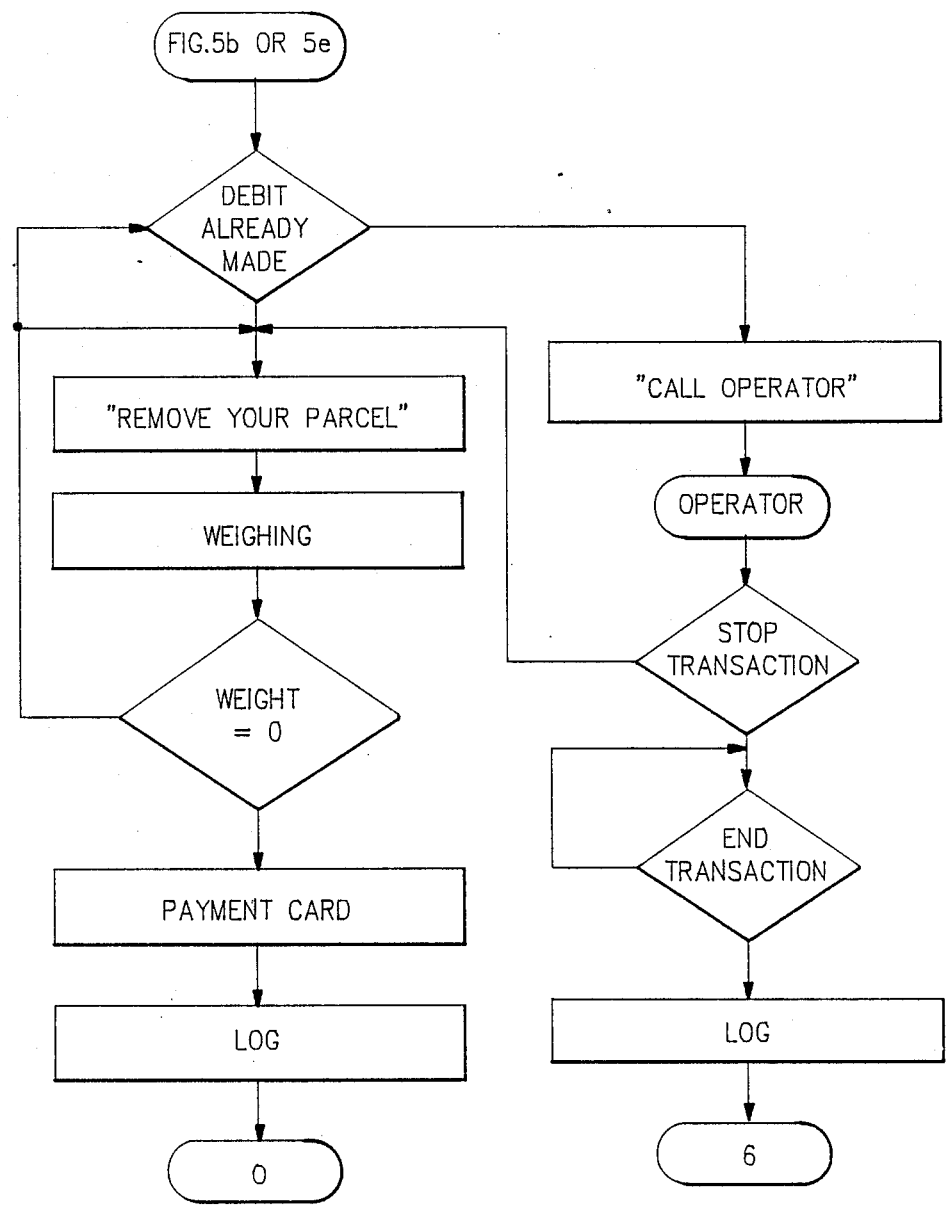
Figure 5C:
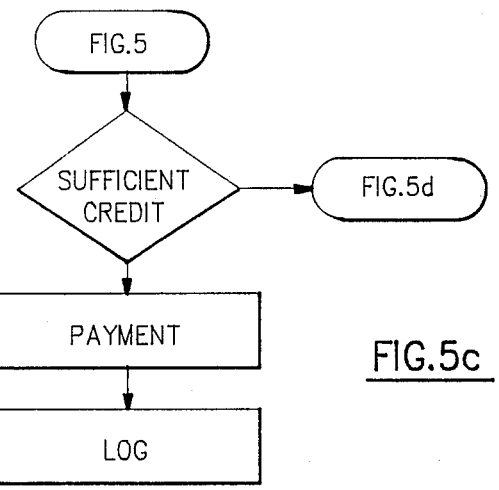
Figure 5E:
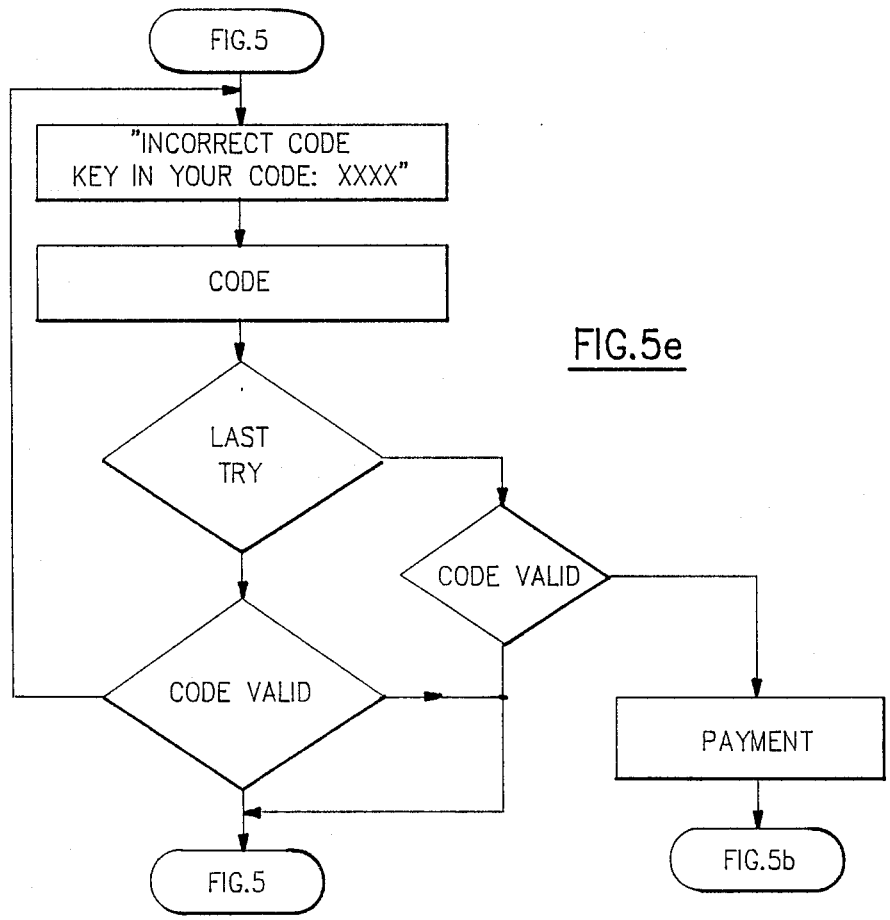

In accordance with FIG. 5c, DIOC/payment tests whether the credit is sufficient. DIOC/payment performs the debit on the variables which are in DBAS, updates the log, and proceeds to the subsequent dialog (DIOC/editing).

In the event that the credit is not sufficient, DIOC/payment asks (cf. FIG. 5(d) the customer if he wishes to pay with another card:

pay with another card:

DIOC performs the debit on the variables which are in DBAS, and sends the command "return card" to (11) which will reply "card returned". DIOC/payment updates the log, and the system returns to the start of DIOC/payment to debit another card not pay with another card:

If no debit has been started, the customer is told to remove his parcel; DIOC/payment knows this by interrogating the scale (3). Then, once the parcel has been removed, the command "return card" is sent. The system returns to the start of DIOC/weighing (initial messag(e). If a debit has already been made on another card, a message tells the customer to call the operator. The latter interrupts the system (using DIOJ). The operator interrupting the system will finish the transaction. DIOI sends the command "finished" to DIOC/payment and will proceed to the DIOC/editing dialog. The log is updated.

3.2.2 Incorrect code (cf. FIG. 5e):

A message indicates to the customer that his code is incorrect and that he must re-enter his code. The customer is entitled to three tries. When the customer re-enters his code, DIOC/payment tests the code. As soon as the code is correct, the normal DIOC/payment procedure recommences.

If at the end of three tries the code is incorrect, the card is trapped by DIOC/payment (the parameter "trapped" of the card in DBAS is set to true). According to the present invention, "trapped" does not mean that the payment card is retained in the machine, but that the appropriate item of information is printed on the magnetic strip (12a) of the card (12), which will render the card unusable, bearing in mind the checking of said item of information during the card validation phase (cf. FIG. 5).

Subsequently, several cases are possible (cf. FIG. 5b).

(3.2.2.1) Debit not started

The customer is told to remove the parcel (command given to (3)). When the parcel is lifted, he is told to take his card (command "return card" sent to (3) which replies "card returned"). The system then proceeds to the start of DIOC/weighing (initial message), having updated the log.

(3.2.2.2) Debit already made on a card

A message tells the customer to call the operator. The latter interrupts the system (using DIOJ). He will have two possibilities:

stop transaction

DIOJ sends "stop" to DIOC/payment. DIOC/payment tells the customer to remove his parcel. DIOC/payment interrogates the scale (3). Then, once the parcel has been lifted, DIOC/payment sends the command "return card" to (11) which will reply "card returned".

The system then proceeds to the start of DIOC/weighing (initial messag(e), having updated the log.

end of transaction

DIOC has received the order "end" from DIOJ. DIOC updates the log and proceeds with the rest of the DIOC/editing dialog.

IV—DIOC/EDITING; (cf. FIG. 6)

DIOC sends to the peripheral (13) the command "ticket", in order to initiate printing of the ticket. The "editing" module will reply either "end of editing" or "error-imp", namely printing error, to DIOC.

4.1 End of output

The ticket has been printed without problems.

4.2 "Error-imp"

There has been a printer error (paper on printer). A message tells the customer to call the operator. The latter will use DIOJ to interrupt the system and will be able either to stop the transaction or to finish the transaction.

4.2.1. Stop transaction

DIOJ sends the command "stop" to DIOC. The transaction is stopped, A message tells the customer to remove his parcel. DIOC knows when the parcel has been removed by interrogating the scale (3). Once the parcel has been removed, DIOC sends the command "return card" to (11), which will reply "card returned". The system then proceeds to the start of DIOC/weighing (initial message).

4.2.2. End transaction

DIOJ sends the command "end" to DIOC; the transaction must end, the ticket is re-edited, and the program returns to the start of DIOC/editing. In the event that printing takes place without problems (DIOC receives the message "end editing"), DIOC asks the customer to remove his parcel. Once the parcel has been removed, DIOC sends the command "return card" to the peripheral (11) which will reply "card returned". The program then proceeds to the start of DIOC/weighing (initial message).

Each time DIOC asks the customer to remove his parcel, DIOC sends to the scale (3) the command "lectbal" and awaits a reply from (3). At this point, DIOC examines the value of the weight and recommences interrogation of (3) while the weight is not zero. When the weight is zero, "DIOC" sends the order "stop bal" to (3) to stop interrogation of the scale.

Before commencing a transaction, DIOC must check that there is no mains fault or paper fault.

The mains fault is detected by an appropriate module. When a fault is detected, independent operation is limited to 20 minutes. At the end of 20 minutes, the above-mentioned module sets the variable DEFSEC in DBAS to "true". In this case, DIOC cannot start a transaction.

Before starting each transaction, DIOC checks that there is no paper fault. If this is the case, a message indicates the fault, and DIOC refuses to start any transaction. The operator must then reload the paper.

Each time a problem arises and the operator has to be called, DIOC will activate a buzzer if the associated parameter is set to "true" by DIOJ, in the configuration menu, the parameter concerned being the parameter "alarm".

The DIOJ software steers and controls the dialog between the operator and the system, by means of the terminal (14) which is reserved exclusively for the operator; the latter can only be activated by means of the locking system (15, 15a).

Eight functions are accessible through DIOJ:
(1) configuration of the system by the operator, "C"
(2) initialization of a blank card, "I"
(3) interruption, that is to say intervention in the DIOC software, "R"
(4) examination of a card (12), "E"
(5) log (21), "J"
(6) system maintenance, "M"
(7) operation, that is to say intervention in the system, for example in order to change the plug-in readonly memories (8) and (9), "O"
(8) exit from a function, "*".

Each function is known by a letter. For example: "C" for configuration.

As soon as one of the letters of the keyboard (14a), designating a function, is pressed, the function is called and activated. To call a function while another is active, it is first necessary to deactivate the active function, then to select the desired function by pressing (on the keyboard (14a)) the letter encoding the function.

Each of the abovementioned functions will be examined below.

Configuration: "C"

For this function the operator configures the system by entering the value TRUE or FALSE or numeric or alpha-numeric values, for various parameters specific to the system.

(1) log editing mode

Instantaneous (real time) or deferred.

In instantaneous mode, the system edits the log for each debit (even if incomplete). In deferred mode the log is updated and printed when requested by the operator.

(2) alarm

Activation of an alarm in the event of customer problems, that is to say when a "call operator" message appears on the display unit (10).

(3) communication 1 to 10.

Ten numbers are possible.

A number characterizes the use of the serial link for communication:

EXAMPLE: 1 printer (20) for editing log (21), and 10: no link.

(4) updating the date

The operator updates the date: DD/MM/YY.

(5) updating the time

The operator updates the time stamp: HH/MN/SS.

(6) insurance

Each parcel may be insured or not.
The operator updates this parameter.

(7) destination

The operator validates the fact that the customer enters his destination during a transaction. In fact, and if the rate used is independent of the destination, the customer need not enter the latter.

(8) self-service window or not

The operator indicates whether the system will be self-service or operator-assisted.

Initialization of a blank card: "I"

When a customer buys a magnetic card (12), the latter must be initialized by the system, this being done by the operator. To do so, the operator will enter his name via the terminal (14), and the customer will enter his secret code at the keyboard (4), having read a suitable message on the display unit (10).

Once it has been entered, the customer must have memorized the code; he will enter it again to validate any transaction with the system. If the code is invalid, he is asked for his code twice more; and at the end of three unsuccessful attempts the card (12) is trapped as described above. The code comprises four characters.

According to the invention, the control code is selected and memorized only by the user or customer.

Interruption: "R".

The interruption enables the operator to know or acquire the balance of a transaction in progress, by communicating with DBAS.

The following values are accessible to the operator, and can be read, modified or written by him:
the total cost
the declared value, for the purposes of insurance
the sum already paid, debited on the card
what remains to be paid.

The secret code, which is present on the payment card, is not accessible to the operator.

The operator can also use this function to stop and hence cancel the transaction or to complete the transaction, instead of the system and/or the customer, as described above.

Examination of the card: "E"

The operator can use this function to learn the contents of a card (12), except the secret code, and specifically:
company name or commercial name of the bearer
expiry date of the card
card trapped or not
discount allowed to customer.

Log: "J"

This function makes it possible to initiate the complete editing of the log and to erase the log.

Maintenance: "M"

This function enables the operator to verify the state of the peripherals:
scale (3)
magnetic card reader (11)
printer (13)
EPROM cartridge (8)
EEPROM cartridge (9).

Moreover, a variable provided in DBAS will show whether the system is battery- or mains-powered.

Operation: "O"

This function enables the operator to insert a new EPROM (8) and/or EEPROM (9) cartridge.

Exit: "*"

The code makes it possible to exit from one function in order to activate (call) another.

The principal algorithms specific to each of the preceding functions are described below.

Configuration

Eight parameters have to be initialized:

(1) INSTANTANEOUS OUTPUT, namely editing of the log of transactions as the transactions take place (2) VAL ALARM, namely outputting of an audible alarm signal (buzzer) each time the operator is called by the DIOC software (3) COMMUNICATION, namely system communication mode, for example with the printer used to edit the log (4) DATE (5) TIME (6) VAL-ASSURANCE, namely the choice offered to the customer whether or not to insure his parcel.

(7) VAL-DESTINATION, namely the choice of the charging mode, either flat-rate charging, in which case the customer need not key in his destination, or differential charging depending on destination, in which case the customer must key in his destination (8) SELF-SERVICE, that is to say independent operation of the system or with the aid of an operator.

The operator dialog describes these parameters in "rolling" mode; the parameters appear sequentially and the system proceeds from the last to the first systematically. Exit via key "*". The parameters are entered in the DBAS database.

INSTANTANEOUS OUTPUT: true or false

VAL ALARM: true or false

NUM COMMUNICATION: from 1 to 10

DATE: DD/MM/YY

TIME: HH/MN/SS

VAL ASSURANCE: true or false

VAL DESTINATION: true or false

SELF SERVICE: true or false.

The messages are displayed on the display (14b) of the terminal (14).

Figure 7:
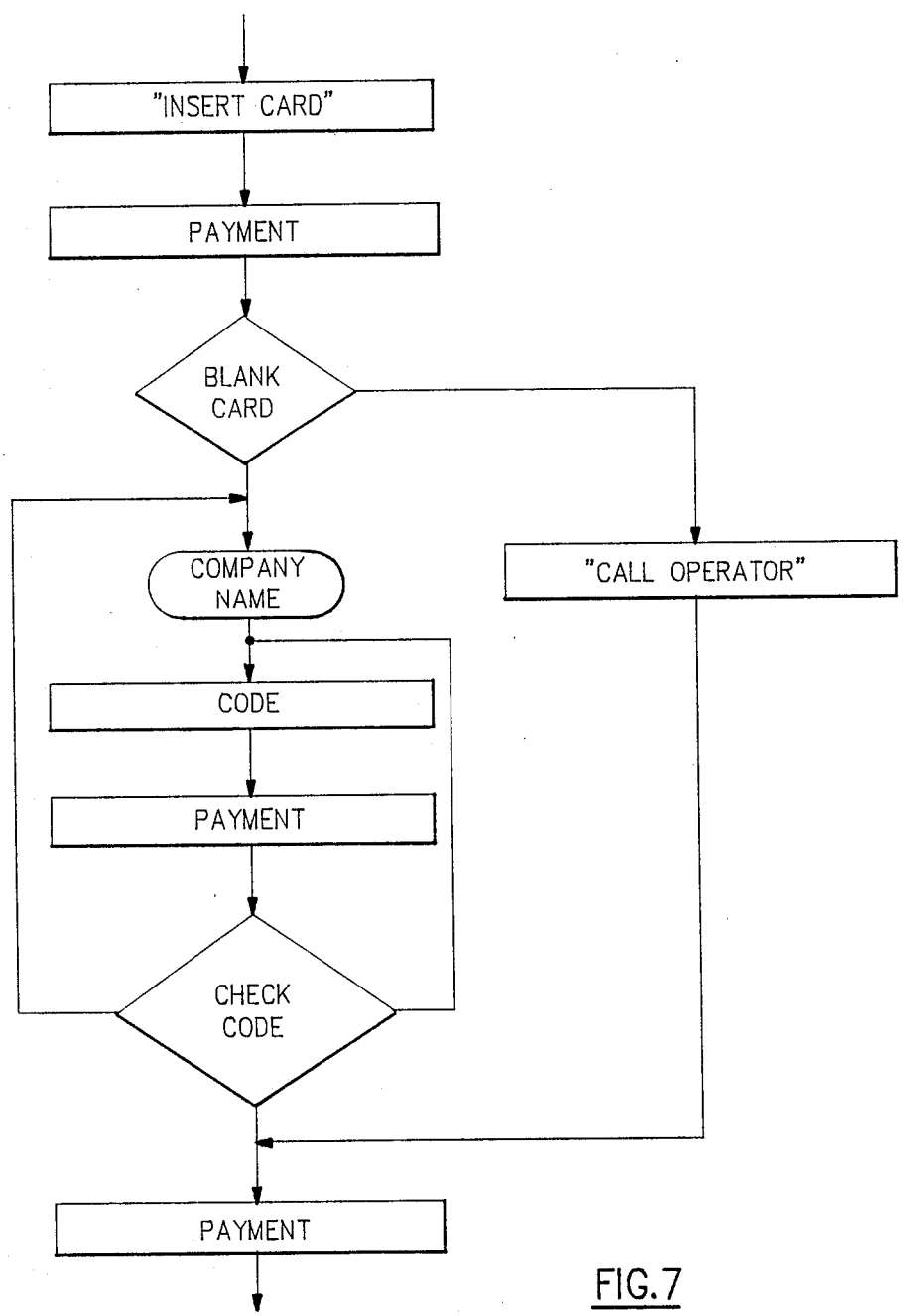
FIGS. 7 to 10 represent the flowchart of the various programs which can be run by the operator of a system according to FIG. 1

Initialization of a blank card; cf. FIG. 7

DIOJ sends the command "lect-carte" (read card) to the peripheral (11), and displays a message on the system display unit (10) to tell the customer to insert his card. When (11) has read the card, this peripheral sends "card read" to DIOJ.

DIOJ tests if the card is blank.

Two cases:

blank card

A message displayed on the terminal (14) asks the operator to enter the company name or name of the customer with the keyboard (14a). The company name is displayed on the display unit (10). It will be validated by the customer by pressing the "VAL" key of the keyboard (4b).

A message on the display unit (10) then asks the customer to input his secret code (four digits). The code is validated by the customer on the keyboard (4a).

If the code is correct, DIOJ sends the command "return card" to the peripheral (11) which will reply "card returned". At this point the system exits from the "blank card initialization" function.

If the code is incorrect, the system returns to the initial acquisition of the secret code.

card not blank:

The card is not blank, and a message indicates to the operator, on the terminal (14), the problem concerned. DIOJ sends the command "return card" to (11). DIOJ awaits the command "card returned" and exits from the "blank card initialization" function.

Figure 8:
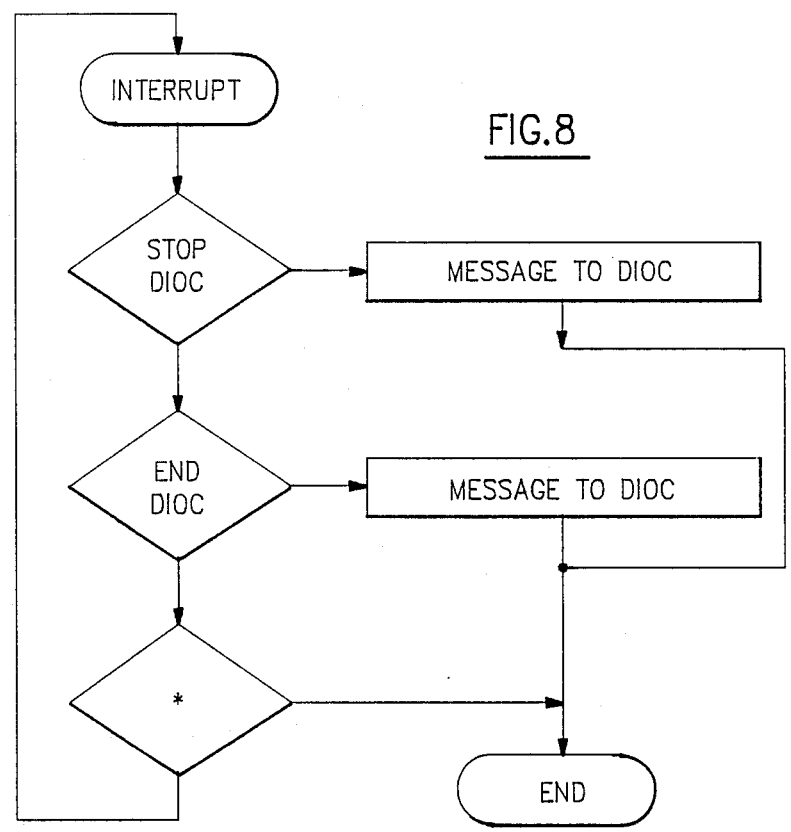

Interruption: cf. FIG. 8

The interruption permits the operator to read, write or modify data related to the cost of transport. In addition to these data (which are in the DBAS database), the operator can take two actions (which are mutually exclusive).

stop transaction the operator stops the transaction, in which case DIOJ sends the command "stop" to DIOC.

end transaction the operator ends the transaction, in which case DIOJ sends the command "end" to DIOC.

The actions "STOP transaction" and "END transaction" will not have any effect unless the transaction is in progress.

The system exits from the interruption as soon as one of the two above actions has taken place (even if a transaction is not in progress). The interruption can also be exited by pressing the key "*" (exit function) of the keyboard (14a).

Figure 9:
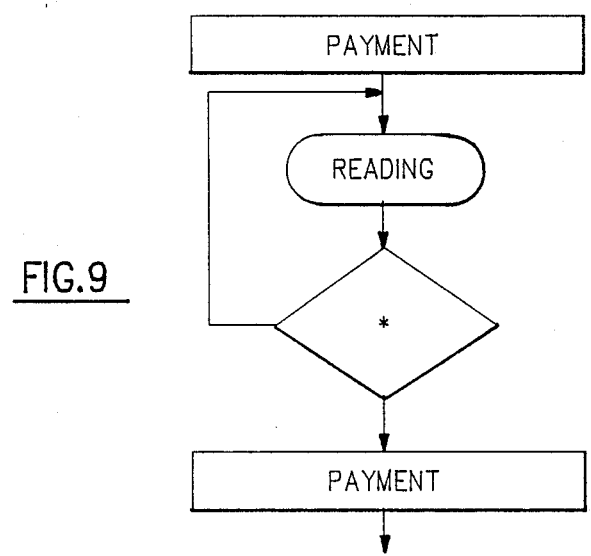

Examination of the card; cf. FIG. 9

A certain number of data held on a customer's card can be read by the operator, except for the secret code. The data are displayed on the display (14b) of the terminal (14). The operator actuates the keyboard (14a) of the terminal (14). The parameters are listed in "rolling" mode, as for the configuration. DIOJ sends the command "lect-carte" (read card) to the peripheral (11) which will reply "card read". At this point DIOJ displays the data which can be accessible to the operator. To pass from one item of information to the next, the operator presses the (return) key of the keyboard (14a).

To exit from card examination, the operator presses "*".

The accessible data are, specifically:

customer's name or company name discount granted customer's expiry date (sic)

card trapped or otherwise.

On exiting from examination/card, DIOJ sends "return card" to the peripheral (11), which will reply "card returned".

Figure 10:
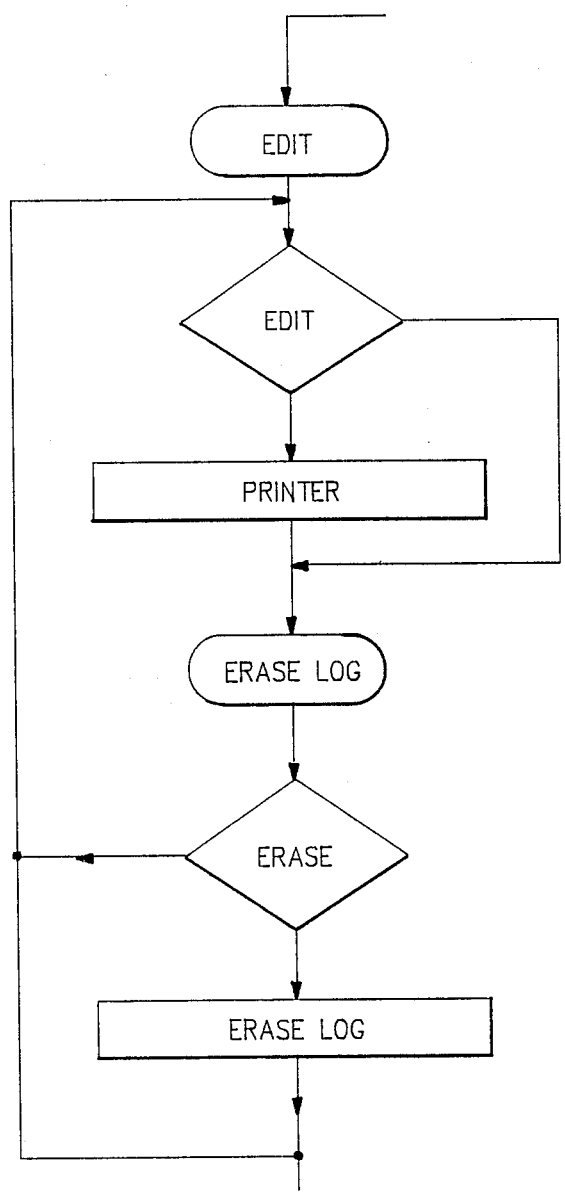

Log; cf. FIG. 10

The "log" function can be exited at any time by pressing the key "*". In the event that editing is taking place, editing will be stopped.

When the operator initiates editing, DIOJ sends the command "EDIT" (editing) to the printer (20). When the operator wishes to erase the log, DIOJ sends the command "ERASE" to the peripheral (20). If the operator wishes to erase the log, a message will ask him to confirm his selection.

In the event that the operator presses "*", while editing is in progress, DIOJ will send the message "END EDIT" (end of editing) to the printer (20).

Maintenance

At any time, by selecting the maintenance function, the operator can determine the status of the peripherals. To do this, DIOJ lists a certain number of messages in "rolling" mode. The status of the peripherals is in DBAS, in the form of a table. Each box of the table is a byte, which is true if the fault exists or false if the peripheral is in working order.

DIOJ has only to read this table. To exit from the maintenance function, the operator presses "*".

What is claimed is:

1. System for weighing an article (1) and for editing a label (2a) serving as a transport coupon for said article, comprising the following peripherals:
   a scale (3) supplying a numeric item of information whose value is the weight of the article
   a user keyboard (4) for the acquisition by the user firstly of a coded item of information, representing the destination of the article, and secondly of various commands
   a message or data display unit (10), intended for the user
   a payment card reader (11), said cards comprising a medium (12a) for an item of information which can be machine-read and machine-modified, having the value of a credit
   a printer (13), for editing and outputting the label (2a) serving as a transport coupon and comprising a central processing unit possessing:
      a data processing unit (5), for example a microprocessor,
      a read-only memory (7) for the storage of a data processing software, permitting a dialog with the user, and ensuring the automatic functioning of the system, as a function of the data exchanged both with the user and with the various peripherals,
   wherein the system further possesses a terminal (14) intended for an operator, possessing a message or data display unit (14b) intended for the operator and an operator keyboard (14a) for the acquisition by the operator of various commands or data, particularly instead of those of the user, capable of ensuring complete functioning of the system whatever may be the errors made by the user.

2. System as claimed in claim 1, wherein it possesses a locking member (15), intended for the operator, comprising two positions, one of fully automatic functioning of the system without intervention by the operator, and the other of partially assisted functioning to compensate for the inadequacies, errors or mistakes made by the system and/or the user.

3. A system as claimed in claim 1, according to which an elementary transaction comprises the following stages:
   (a) the weight of the article is determined and monitored with the scale (3)
   (b) the user inputs the destination of the article with the keyboard (4),
   (c) the system determines the cost of transport, from parameters stored in the read-only memory (8, 9), such as charges or geographical identification of the location of the weighing system
   (d) the user introduces into the reader (11) his payment card (12), which is checked, then, on the data medium (12a) of said card, the initial credit is replaced with a new value equal to said initial credit less the cost of transport
   (e) with the printer (13), a transport coupon, indicating the destination in particular, is edited to be affixed by the user to the article wherein, during any transaction, the operator can use the terminal (14) to request either cancellation of the transaction or completion of the transaction, that is to say editing of the transport coupon.

4. A system as claimed in claim 1, according to which an elementary transaction comprises the following stages:
   (a) the weight of the article is determined and monitored with the scale (3)
   (b) the user inputs the destination of the article with the keyboard (4)
   (c) the system determines the cost of transport from parameters stored in the read-only memory (8, 9), such as charges or geographical identification of the location of the weighing system
   (d) the user introduces into the reader (11) his payment card (12), which is monitored, then, on the data medium (12a) of said card, the initial credit is replaced with a new value equal to said initial credit less the cost of transport
   (e) with the printer (13), a transport coupon, indicating the destination in particular, is edited to be affixed by the user to the article wherein, during any transaction, the operator can access, via the terminal (14), the various operational data or values determined in particular by the weighing system or introduced by the user, which are necessary to the transaction and are stored in the read-only memory (7) of the system.

5. System as claimed in claim 4, wherein, via the terminal (14), the operator can read, modify or acquire the various operational data or values necessary for the transaction.

6. System as claimed in any one of claim 3, wherein, via the terminal (14), the operator can initialize a payment card, that is to say write on the data medium (12a) of a blank card at least the value of a credit.

7. System as claimed in any one of claim 3, wherein, via the terminal (14), the operator can examine the payment card, that is to say read on the data medium (12a) of the latter the value of the various existing data.

8. System as claimed in claim 6, wherein, on the one hand, during the payment card initialization phase, via the keyboard (4), the user can write a secret code, unknown to the system, on the data medium (12a) of the card (12), and on the other hand, during the payment phase ((d), the user again enters, via the keyboard (4), his secret code which is compared with that read by the reader (11) on, the card (12).

9. System as claimed in claim 3, wherein, throughout the transaction, the weight returned by the scale (3) is continuously compared with a zero value, and in case of zero weight the transaction is canceled.

10. A weighing system as claimed in claim 1, wherein an editing medium comprises a sheet whereof one side is intended for printing, the sheet possessing a transverse tear-line (17) defining two parts, whereof one (2a) is covered by a peel-off label.

* * * * *